United States Patent [19]

Yamazaki

[11] 4,129,983
[45] Dec. 19, 1978

[54] LIQUID CRYSTAL DIGITAL DISPLAY ELECTRONIC WRISTWATCH

[75] Inventor: Yoshio Yamazaki, Suwa, Japan

[73] Assignee: Kabushiki Kaisha Suwa Seikosha, Tokyo, Japan

[21] Appl. No.: 633,734

[22] Filed: Nov. 20, 1975

[30] Foreign Application Priority Data

Nov. 21, 1974 [JP] Japan .................. 49-133920

[51] Int. Cl.² ............... G04B 19/30; G02F 1/13; C09K 3/34
[52] U.S. Cl. ................ 58/50 R; 252/299; 252/408; 350/350; 58/23 R
[58] Field of Search ............. 58/50 R, 23 R; 350/160 LC; 252/299, 408

[56] References Cited

U.S. PATENT DOCUMENTS

| | | | |
|---|---|---|---|
| 3,613,351 | 10/1971 | Walton | 252/299 |
| 3,738,099 | 6/1973 | Tanaka | 58/50 R |
| 3,750,383 | 8/1973 | Kakizawa | 252/408 |
| 3,760,406 | 9/1973 | Walton | 58/50 R |
| 3,800,524 | 4/1974 | Matsumura et al. | 58/50 R |
| 3,828,547 | 8/1974 | Fujita | 58/50 R |
| 3,845,615 | 11/1974 | Cake | 58/50 R |
| 3,881,806 | 5/1975 | Suzuki | 252/299 |
| 3,889,459 | 6/1975 | Lu | 58/50 R |
| 3,923,857 | 12/1975 | Boller et al. | 252/299 |
| 3,927,064 | 12/1975 | Boller et al. | 252/299 |
| 3,947,375 | 3/1976 | Gray et al. | 252/299 |
| 3,949,546 | 4/1976 | Saito | 58/50 R |
| 3,954,653 | 5/1976 | Yamazaki | 252/299 |
| 3,975,286 | 8/1976 | Oh | 252/299 |
| 3,981,817 | 9/1976 | Boller et al. | 252/299 |
| 3,984,344 | 10/1976 | Cole, Jr. | 252/299 |
| 4,000,084 | 12/1976 | Hsieh et al. | 252/299 |
| 4,011,173 | 3/1977 | Steinstrasser | 252/299 |
| 4,020,002 | 4/1977 | Oh | 252/299 |
| 4,043,935 | 8/1977 | Kanbe | 252/299 |
| 4,083,797 | 4/1978 | Oh | 252/299 |

FOREIGN PATENT DOCUMENTS

| | | | |
|---|---|---|---|
| 814291 | 8/1974 | Belgium | 252/299 |
| 2349777 | 6/1974 | Fed. Rep. of Germany | 252/299 |
| 2415929 | 10/1974 | Fed. Rep. of Germany | 252/299 |
| 2321632 | 11/1974 | Fed. Rep. of Germany | 252/299 |
| 2502904 | 7/1975 | Fed. Rep. of Germany | 252/1299 |
| 49-88791 | 8/1974 | Japan | 252/299 |

OTHER PUBLICATIONS

Boller, A., et al., Proc. of the IEEE, pp. 1002-1003.

Primary Examiner—Benjamin R. Padgett
Assistant Examiner—T. S. Gron
Attorney, Agent, or Firm—Blum, Moscovitz, Friedman & Kaplan

[57] ABSTRACT

A liquid crystal digital display electronic wristwatch wherein the digital display is driven at the same potential as the remaining elements comprising the electronic wristwatch is provided. The electronic wristwatch includes an oscillator circuit for producing a high frequency time standard signal and a divider circuit for producing low frequency timekeeping signals in response to the high frequency time standard signal. A decoder circuit produces decoded signals representative of present time in response to the timekeeping signals and a driver circuit in response to the decoded signals being applied thereto drives the liquid crystal digital display. A DC power source is adapted to produce and apply a predetermined potential to at least said oscillator circuit, divider circuit, decoder circuit and driver circuit and thereby operate said respective circuits having said predetermined potential applied thereto at the same potential.

1 Claim, 6 Drawing Figures

LIQUID CRYSTAL DIGITAL DISPLAY ELECTRONIC WRISTWATCH

BACKGROUND OF THE INVENTION

This invention is directed to liquid crystal digital display electronic wristwatches and in particular to operating the liquid crystal digital display at the same potential as the remaining circuitry comprising the electronic wristwatch. Although electronic wristwatches utilizing liquid crystal display cells to comprise a digital display have been introduced into the marketplace, the use of liquid crystal display cells has been less than completely satisfactory. Specifically, the liquid crystal display cells heretofore utilized in electronic wristwatches have been driven at operating potentials that are considerably higher than the potential of the DC battery utilized to drive the remaining components of the electronic timepiece. Moreover, the potential required to operate the liquid crystal display cell has been of such magnitude that an AC driving voltage is required to prevent deterioration of the liquid crystals. Accordingly, the driver circuit in such liquid crystal digital display electronic wristwatches have been characterized by the inclusion of a booster circuit for elevating the potential applied to the digital display cells and AC to DC potential conversion circuitry for converting the elevated DC potential to an AC driving voltage.

SUMMARY OF THE INVENTION

Generally speaking, in accordance with the invention, a liquid crystal digital display electronic wristwatch wherein the liquid crystal digital display is operated at the same potential as the remaining circuitry comprising the electronic timepiece is provided. The electronic wristwatch includes an oscillator circuit for producing a high frequency time standard signal and a divider circuit for producing low frequency timekeeping signals in response to the high frequency time standard signal being applied thereto. A decoder circuit produces decoded signals representative of present time in response to timekeeping signals being applied thereto. A driver circuit in response to decoded signals being applied thereto drives the liquid crystal display to display present time. A DC power source is adapted to produce and apply a predetermined potential to at least the oscillator circuit, divider circuit, decoder circuit and driving circuit to operate the respective circuits coupled thereto at said predetermined potential.

Accordingly, it is an object of the instant invention to provide an improved liquid crystal digital display electronic timepiece wherein the liquid crystal display cell is operated by the unidirectional potential produced by the battery included in the electronic wristwatch.

Another object of the instant invention is to provide an improved liquid crystal digital display electronic wristwatch wherein the organic liquid crystals comprising the display cell and a driver circuit comprised of CMOS integrated circuitry permit the elimination of a booster circuit.

Still a further object of the instant invention is to provide a digital display driver circuit for minimizing the power consumption in an electronic wristwatch by reducing the potential at which the digital display is operated.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
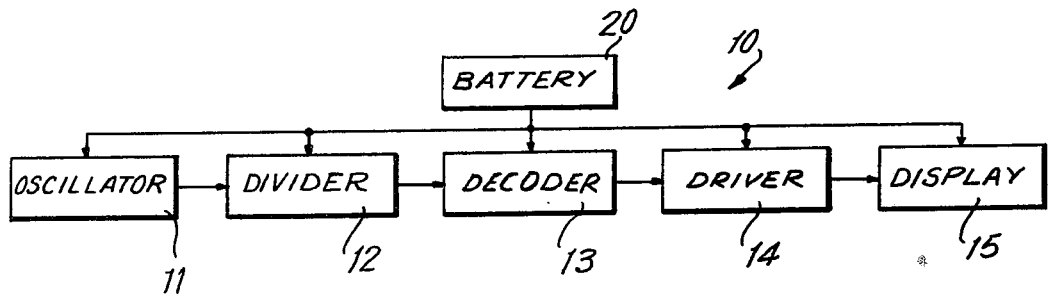
FIG. 1 is a block circuit diagram of an electronic wristwatch constructed in accordance with the prior art.

Reference is now made to FIG. 1, wherein a block circuit diagram of an electronic timepiece, generally indicated at 10, depicts the components that comprise the digital display electronic wristwatch. Specifically, an oscillator circuit 11 produces a high frequency time standard signal, which signal is received by a divider circuit 12. Divider circuit 12 in response to the high frequency time standard signal produced by the oscillator circuit 11 produces low frequency timekeeping signals, which signals are applied to a decoder circuit 13. Decoder circuit 13 decodes the timekeeping signals and produces decoded signals representative of present time, which signals are in turn applied to a driver circuit 14. Driver circuit 14 energizes a display 15 comprised of digital display elements formed in a seven-bar configuration. A DC battery 20 is coupled to the oscillator circuit, divider circuit 12, decoder circuit 13, driver circuit 14 and digital display 15 in order to energize same in the usual manner.

Figure 2:
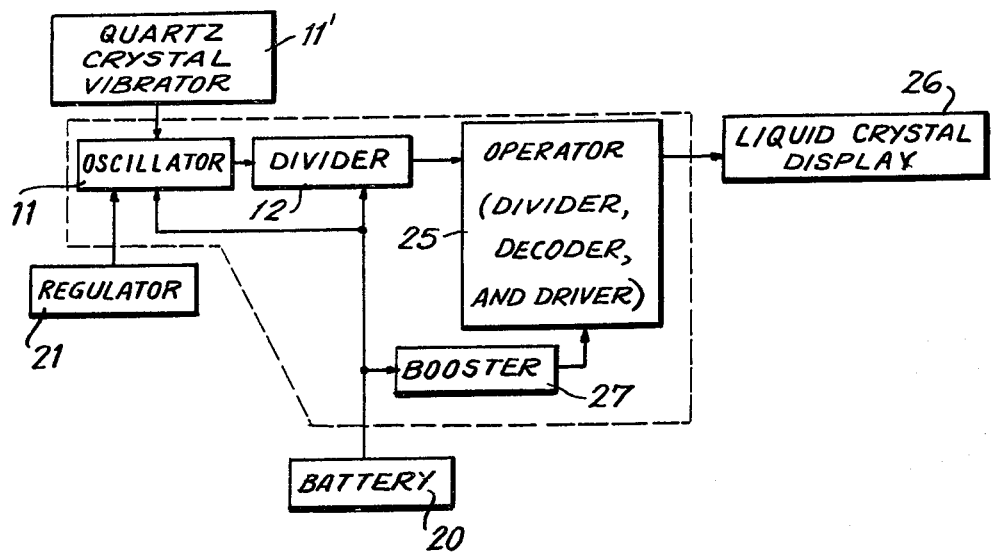
FIG. 2 is a block circuit diagram of a liquid crystal digital display electronic wristwatch constructed in accordance with the prior art.

Referring specifically to FIG. 2, a liquid crystal digital display electronic timepiece constructed in accordance with the prior art is depicted, like reference numerals being utilized and like elements depicted in FIG. 1. The oscillator circuit 11 includes a quartz crystal vibrator 11' as a high frequency time standard and a regulator 21 for tuning the frequency of the high frequency time standard signal produced thereby. The low frequency timekeeping signals produced by the divider circuit 12 are applied to an operator circuit 25, which operator circuit converts the low frequency timekeeping signals and utilizes same to drive the liquid crystal display 26. The operator circuit 25 includes divider stages for producing signals representative of the digits of time to be displayed, decoder circuits associated with the respective divider stages and a driver circuit for applying the decoded signals to the liquid crystal display 26. The battery in a liquid crystal display wristwatch produces an effective DC potential of 1.5 volts, which potential is sufficient to drive the oscillator and divider circuits but is insufficient to drive the liquid crystal display cell. Accordingly, either a booster circuit is disposed intermediate the DC battery 20 and the respective divider, decoder and driver circuits comprising the operator circuit 25 or alternatively, one, two, or each of the respective divider, decoder and driver circuits are provided with booster circuits for elevating the potential produced by the battery 20 to a sufficient level to effect a driving of the liquid crystal display cells. Such circuits as coil-booster circuits and capacitor-booster circuits have been utilized to achieve such potential elevation. Accordingly, the instant invention is directed to eliminating the use of such booster circuits in liquid crystal display cell electronic wristwatches.

Specifically, by permitting each of the timekeeping circuits such as the oscillator, divider, decoder and driver to be driven by the battery potential of 1.5 volts, the excess power consumption caused by boosting the potential is avoided. Moreover, the driving of the liquid crystal display cell by a DC potential and the use of a multi-digit time division driver circuit (dynamic driving) wherein a plurality of digits are driven by a single driver, results in a considerable number of output connections of the driver circuit being eliminated and an attendant reduction in the cost of the liquid crystal display cell wristwatch.

Figure 3:
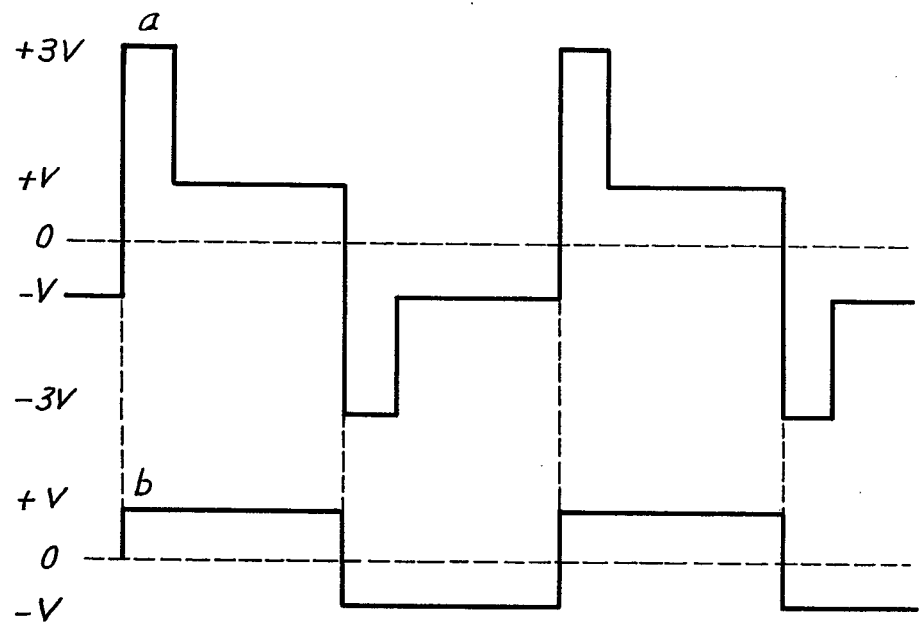
FIG. 3 is a wave diagram illustrating the operation of a liquid crystal display cell driving circuit constructed in accordance with the prior art.

Heretofore, multi-digit time division driving of liquid crystal display cells has been by a ½ bias system and/or a ⅓ bias system. Such a ⅓ bias system is illustrated in FIG. 3, wherein wave diagram a depicts a potential applied to the display cell segments to be energized and wave diagram b represents the potential to be applied to the display cell segments not to be energized. As illustrated therein, a potential is applied to each of the segments not intended to be energized thereby rendering it difficult to avoid energizing such segments and providing insufficient contrast between the energized segments and the non-energized segments due to the inherent characteristics of the liquid crystal display cells. Moreover, the greater the number of digits to be energized, the greater is the reduction in the ratio of the effective voltage applied to the segments not to be energized and the segments to be energized thereby rendering less certain the likelihood that the certain segments to be energized will in fact be energized to provide sufficient contrast.

Figure 4:
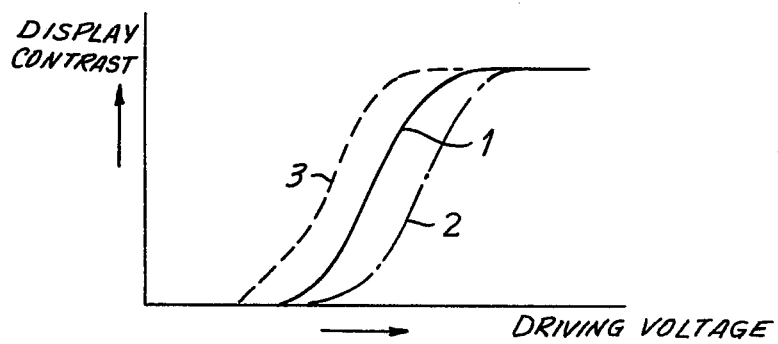
FIG. 4 is a graphical illustration of the manner in which the constrast of a TN liquid crystal display cell varies as a driving voltage is applied thereto.

Referring to FIG. 4, the relationship between the display contrast of a TN field-effect type liquid crystal display cell and the driving voltage applied to effect driving of same is depicted. Solid line curve 1 illustrates the change in contrast of the TN liquid crystal display cell when same is driven over a range of driving voltages at a room temperature of 20° C. Dashed curve 2 illustrates the display contrast over a range of different driving voltages when a TN liquid crystal display cell is at 0° C. and dashed dotted curve 3 illustrates the display contrast over different driving voltages when a TN liquid crystal display cell is at a temperature of 0° C. FIG. 4 illustrates that the following inherent characteristics of a liquid crystal display cell is relevant to its operation in an electronic wristwatch. First, that the threshold voltage and saturated voltage of the liquid crystal display cells vary in accordance with the temperature and an increase in the driving voltage, and secondly, that the inclination of the driving voltage-display contrast curve at any operating temperature only gradually increases. Accordingly, when liquid crystal display cells are utilized in electronic wristwatches of the type discussed above, the duty ratio of the driving signal in dynamic driven digital displays is small. For example, in DSM liquid crystal display cells, the duty ratio is limited to ¼ and in TN type field-effect type liquid crystal display cells the duty ratio is limited to ½.

It is further noted that in the ⅓ bias and ½ bias systems discussed above, the number of discrete levels of the potential applied to a display cell is 5 levels and 3 levels respectively. A high accuracy in the respective levels must be attained in order to avoid generating half-tones, and accordingly considerable expense and power consumption is required to provide a power source and attendant circuitry for providing such discreet levels.

Figure 5:
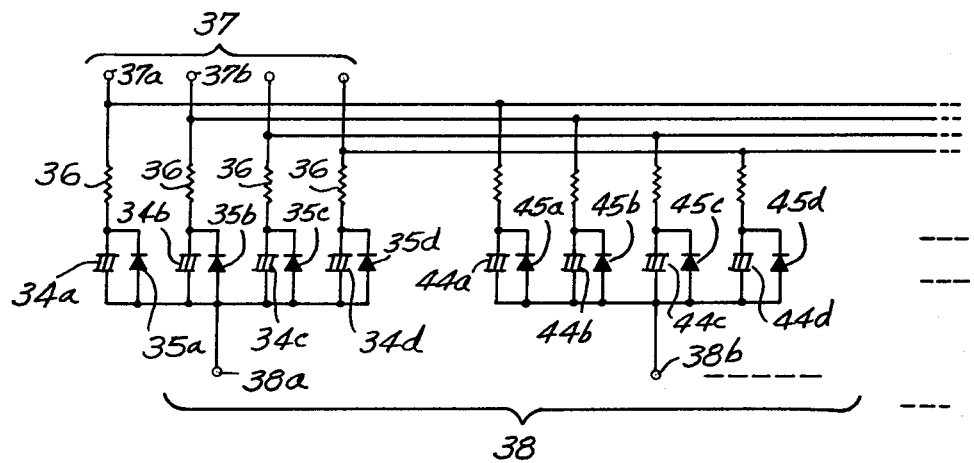
FIG. 5 is a detailed circuit diagram of a multi-display digit time division driver circuit constructed in accordance with the instant invention.
Figure 6:
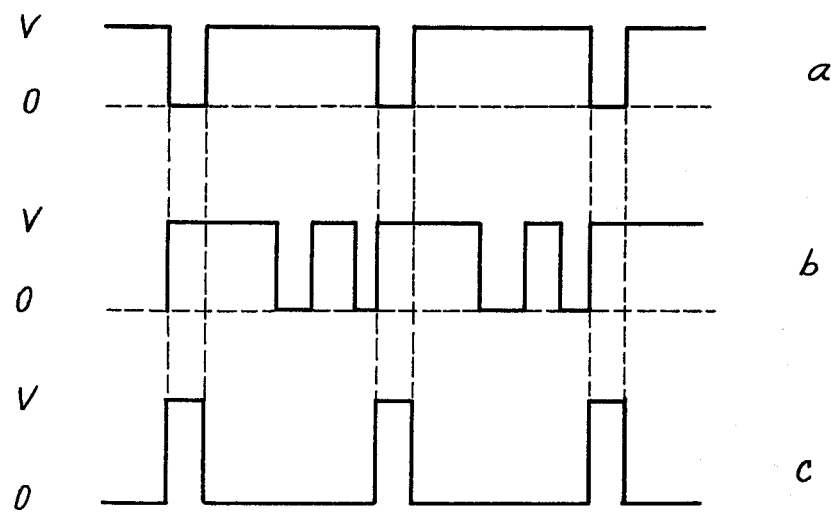
FIG. 6 is a wave diagram illustrating the operation of the driver circuit depicted in FIG. 5.

Reference is now made to FIGS. 5 and 6 wherein a multi-display digit time division driver circuit for driving liquid crystal display cell segments forming a multi-digit digital display is depicted. A digit is comprised of a plurality of liquid crystal display cell segments 34a, 34b, 34c, 34d parallel coupled with corresponding rectifier diodes 35a, 35b, 35c and 35d, respectively. Each parallel coupled display cell segment and associated rectifier diode is coupled at a first side through a resistor 36 to a data signal input terminal 37. It is noted that each respective segment in each display digit, for example, segments 34a and 44a are parallel coupled to data input terminal 37a and segments 34b and 44b are parallel coupled to data signal input terminal 37b. Digit signal input terminals are coupled to the other side of the parallel coupled liquid crystal display cell segments and are sequentially energized in a manner discussed more particularly below.

Referring specifically to FIG. 6, the wave diagrams utilized to effect multi-digit time division driving of the liquid crystal display cell segments are depicted. Wave diagram a is a digit signal respectively applied to the digit signal input terminals 38 and is referenced to a O level potential when a display cell segment is to be energized and is referenced to a V level potential when the display cell is not to be energized. Wave diagram b is a data signal voltage signal and is adapted to be applied to the respective data signal input terminals to energize the respective display cells. The data signal voltages are referenced to a O level potential when the respective display cells are not to be energized and are referenced to a V level potential when the respective display cell segments are to be energized. Wave diagram c represents the potential across a liquid crystal display cells when the digit signal a and data signal b are coincidentally applied to data signal input terminals 37 and digit signal input terminals 38. Accordingly, by applying a O level potential at a particular data signal input terminal and coincidentally applying the V level potential at the corresponding digit signal input terminal, the potential difference across display cell segment 34a is sufficient to effect energization thereof. Accordingly, as depicted in FIG. 6, a unidirectional pulse signal having a pulse length equal to one over the time period for determining the duty cycle is provided. Also, at the time that the display cell segment is not energized, the magnitude of the potential drop across the respective rectifier diodes is inconsequential (approximately 0.5 volts when a silicon gate diode is utilized) and accordingly, the display cell remains not energized. Thus, the ratio of the effective voltage at the time that the display cell segment is energized to the effective voltage at the time that the segment is not energized is not constrained by the magnitude of the applied voltage. Therefore, a liquid crystal display wherein high contrast is achieved and half-tones are avoided and wherein the respective digits formed by the display segments are driven by multi-digit time division driving means is provided. It is noted that the supply voltage need only have two potential levels i.e., a O level potential and a V level potential, and a highly accurate supply potential is not needed so that an inexpensive power source can be utilized thereby reducing the expense in manufacturing the electronic timepiece.

It is noted that the instant invention is equally applicable to static driving of a digital display as to multi-digit time division (dynamic) driving of a liquid crystal digital display and that by connecting the liquid crystal display cell to a DC battery potential on the order of 1.5 volts, such potential operates the oscillator circuit, the divider circuit, decoder circuit and driving circuits and the liquid crystal display to provide an improved electronic wristwatch.

In order for liquid crystal display cells to be actuated in the manner noted above by DC pulses, it is preferred that compounds having a low saturation voltage and a low threshold voltage be utilized. For example, a display panel would utilize a liquid crystal composition as follows:

| Compound | wt.% | |
|---|---|---|
| $C_3H_7$—⟨O⟩—COO—⟨O⟩—C≡N | 5.4 wt.% | |
| $C_4H_9$—⟨O⟩—COO—⟨O⟩—C≡N | 11.6 wt.% | |
| $C_4H_{11}$—⟨O⟩—COO—⟨O⟩—C≡N | 11.1 wt.% | M.R. (mesomorphic phase range) |
| $C_6H_{13}$—⟨O⟩—COO—⟨O⟩—C≡N | 16.7 wt.% | |
| $C_7H_{15}$—⟨O⟩—COO—⟨O⟩—C≡N | 18.6 wt.% | $-1°\ C \sim 53°\ C$ |
| $C_8H_{17}$—⟨O⟩—COO—⟨O⟩—C≡N | 18.5 wt.% | |
| $C_5H_{11}$—⟨O⟩—COO—⟨O⟩—$OC_6H_{13}$ | 18.1 wt.% | |

The above-noted mixed nematic liquid crystal composition is formed in a thin layer having a thickness of 5 microns and is oriented and sealed between two transparent plates having oriented electrodes on the internal surfaces. When the above-noted composition is observed between crossed Nichol prisms, the voltage-contrast characteristics obtained are a threshold voltage, $V_{th}$, of 0.6 volts and a saturation value voltage, $V_{sa}$, of 1.0 volts.

A further example of an organic composition particularly suitable for use with the driver circuit depicted in FIG. 5 is as follows:

| Compound | wt.% | |
|---|---|---|
| $C_4H_9$—⟨O⟩—COO—⟨O⟩—C≡N | 11.5 wt.% | |
| $C_5H_{11}$—⟨O⟩COO—⟨O⟩C≡N | 11.6 wt.% | |
| $C_6H_{13}$—⟨O⟩—COO—⟨O⟩—C≡N | 17.4 wt.% | M.R. (mesomorphic phase range) |
| $C_7H_{15}$—⟨O⟩—COO—⟨O⟩—C≡N | 19.5 wt.% | |
| $C_5H_{11}$—⟨O⟩—⟨O⟩—C≡N | 20.0 wt.% | $-5°\ C \sim 48°\ C$ |
| $C_5H_{11}$—⟨O⟩—COO—⟨O⟩—$OC_6H_{13}$ | 20.0 wt.% | |

The second mixed nematic liquid crystal composition will be formed in a thin layer of 6 microns thickness and sealed between two transparent plates having oriented electrodes on the interior surfaces thereof. When the second composition is observed between crossed Nicol prisms, the threshold voltage, $V_{th}$ obtained is 0.7 volts and the saturated value voltage, $V_{sa}$, is 1.1 volts.

In each of the liquid crystal compounds detailed above, recrystallization from the solvent is usually sufficient and further, band melt purification is performed as occasion demands. The liquid crystal display made by mixing and sealing the purified liquid crystal compounds between the transparent electrodes is based on a composition having extremely stable characteristics when driven by DC potentials and which provides long term stable operation.

It is noted that an electronic wristwatch incorporating a liquid crystal display cell and driver circuit in accordance with the instant invention permits the elimination of the booster circuit and provides for the liquid crystal display to be energized at the same potential as the oscillator, divider, decoder and driver circuits. Moreover, the electronic timepiece circuitry is considerably simplified by the elimination of the booster circuit portion and the AC voltage generator portion of the driver circuit thereby reducing the cost of manufacture and simplifying the design of the watch movement. Also, it is noted that miniaturization of the timepiece permits same to be made thinner and that reduced current consumption by use of multi-digit time division driving is provided. Finally, it is further noted that the instant invention is equally applicable to other miniaturized devices such as table calculators wherein it is desired to operate a liquid crystal digital display at the same potential as the remaining operational circuitry.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An electronic wristwatch, comprising oscillator means for producing a high frequency time standard signal, divider means for producing low frequency signals in response to said high frequency standard signal, decoder means for producing decoded signals representative of present time in response to said timekeeping signals applied thereto, a liquid crystal display means containing a liquid crystal composition consisting essentially of

| | |
|---|---|
| $C_4H_9-\bigcirc-COO-\bigcirc-C\equiv N$ | 11.5 wt. % |
| $C_5H_{11}-\bigcirc-COO-\bigcirc-C\equiv N$ | 11.6 wt. % |
| $C_6H_{13}-\bigcirc-COO-\bigcirc-C\equiv N$ | 17.4 wt. % |
| $C_7H_{15}-\bigcirc-COO-\bigcirc-C\equiv N$ | 19.5 wt. % |
| $C_5H_{11}-\bigcirc-\bigcirc-C\equiv N$ | 20.0 wt. % |
| $C_5H_{11}-\bigcirc-COO-\bigcirc-OC_6H_{13}$ | 20.0 wt. % | except for minor quantities of impurities, and driver means for driving said liquid crystal display means to display present time in response to said decoder signals being applied thereto, said oscillator means, divider means, decoder means, liquid crystal display means and driver means being operable by a single electrochemical cell power source without booster circuitry, said single electrochemical cell power source having a voltage of about 1.5V.

* * * * *